Nov. 9, 1926.  
E. R. FELLOWS  
1,606,353  
INVOLUTE MEASURING MACHINE  
Filed Dec. 21, 1923  2 Sheets-Sheet 2
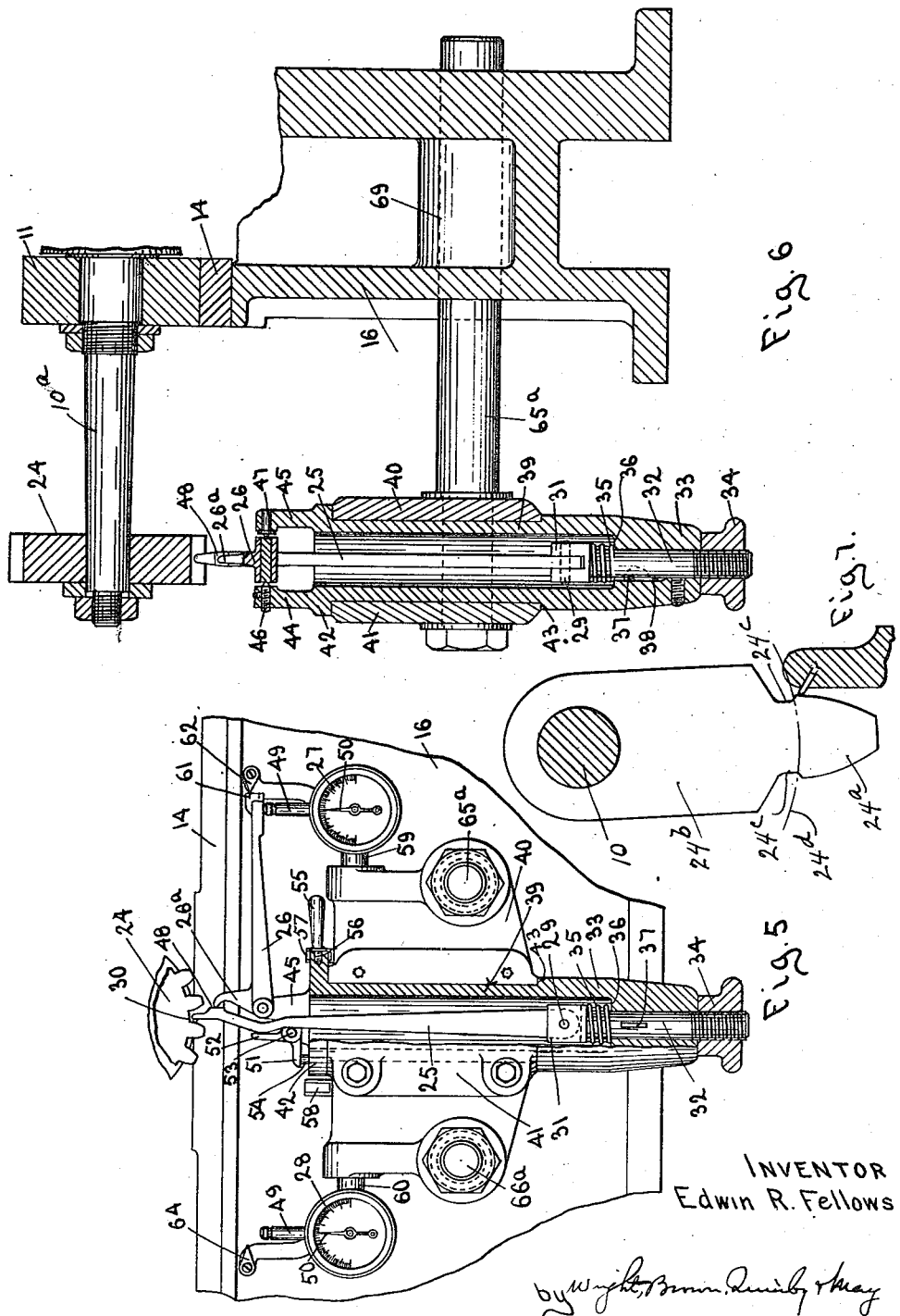
INVENTOR  
Edwin R. Fellows Patented Nov. 9, 1926.

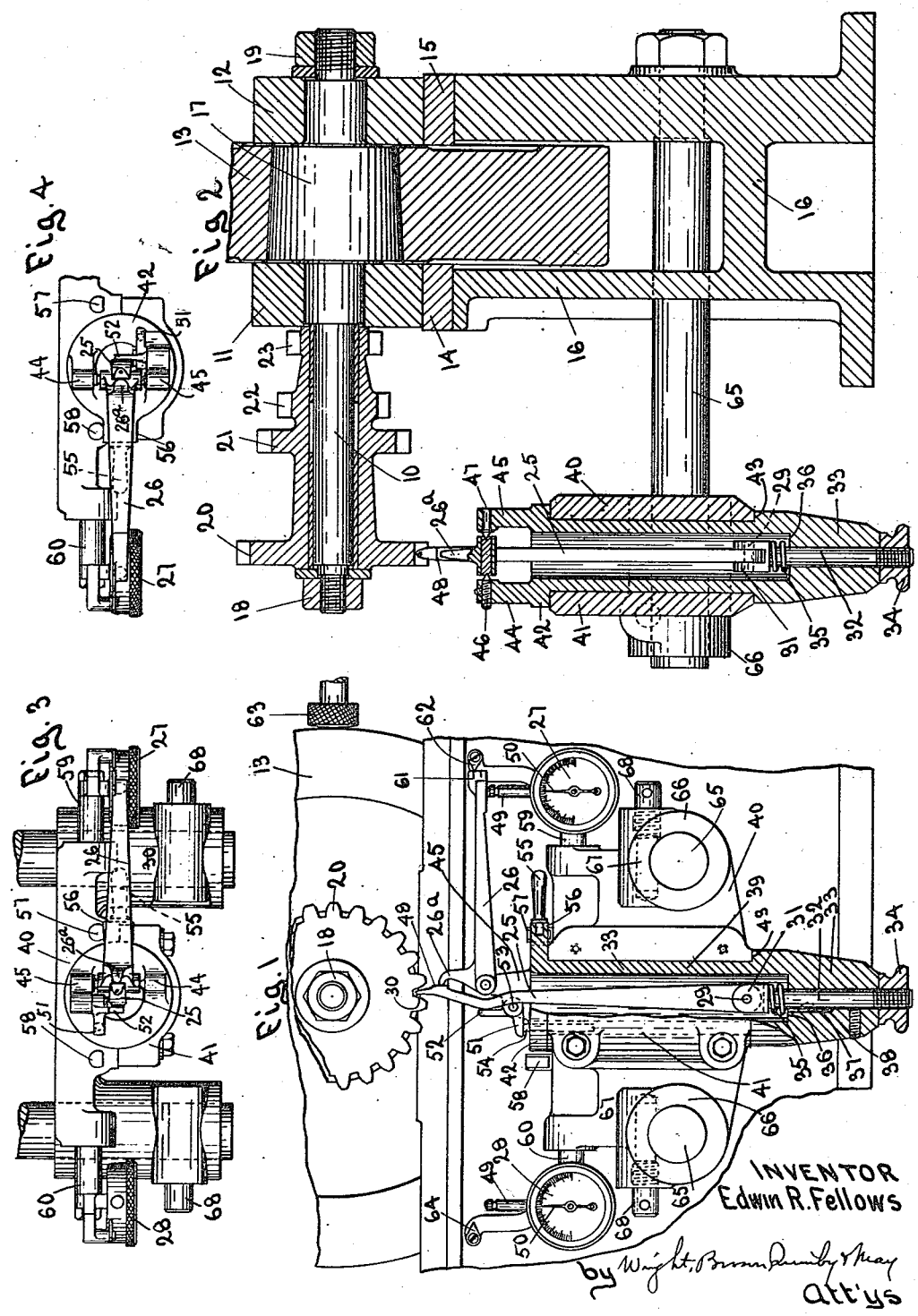

1,606,353

UNITED STATES PATENT OFFICE.

EDWIN R. FELLOWS, OF SPRINGFIELD, VERMONT, ASSIGNOR TO THE FELLOWS GEAR SHAPER COMPANY, OF SPRINGFIELD, VERMONT, A CORPORATION OF VERMONT.

INVOLUTE-MEASURING MACHINE.

Application filed December 21, 1923. Serial No. 681,956.

The present invention relates to measuring or testing apparatus and particularly to devices for testing the accuracy of, and measuring inaccuracies in, involute curves, such as those generated in gear wheels and in similar or analogous articles, including the planing cutters devised by me for generating gear teeth.

The objects which I have accomplished by the present invention are, to provide a reversible testing appliance adapted to be turned into different positions for testing the opposite faces of the same gear teeth without requiring removal from its arbor and reversal of the gear being tested; to enable the testing or measuring apparatus to be placed in different planes so as to be usable with gears placed in different positions on the arbor which holds them while being tested; to enable the contacting point of the testing apparatus to be adjusted by a simple screw and plunger adjustment to a desired height with respect to the gear being tested; and to obtain various other effects and advantages which will appear from the following description.

The preferred form or embodiment of the present invention is shown in the accompanying drawings, in which,—

Figure 1 is a fragmentary front elevation of the machine referred to.

Figure 2 is a transverse vertical section of the same.

Figure 3 is a plan view of the indicating part of the machine placed in position for testing one side of a gear tooth.

Figure 4 is a similar plan view, but omitting the underlying support, and showing the reversible indicating parts in reversed position.

Figures 5 and 6 are fragmentary views similar to Figures 1 and 2 respectively showing modifications in certain details of the machine.

Figure 7 is an elevation of the master tooth form arranged to test the accuracy of adjustment of the feeler.

Like reference characters designate the same parts wherever they occur in all the figures.

For convenience of description I will assume that the machine here shown is designed for testing the involute face curves of gear wheel teeth and that the same is illustrative of other and analogous uses for which machines embodying the same principles, although possibly differing substantially in appearance and details, might be used.

The principle on which the machine operates is that of rolling a gear wheel on the base circle with reference to which its involute tooth curves are generated, upon a plane surface past the point which tends to remain stationary relatively to the gear, but may be moved back and forth in the directions in which the axis of the gear is displaced by rolling. The relation which the stationary point bears to the base circle of the rolling gear is the same as that borne by a point on a string being wound up on or unwound from such base circle. That is, a true involute curve on the gear in contact with such stationary point, will travel, when the gear rolls, past such point without causing any displacement thereof; but an inaccurate tooth face similarly rolling in contact with the point will cause displacement thereof to an extent and in a direction which is a measure of the amount and character of the departures in the tooth face from the true involute curve.

The gear to be tested is mounted on an arbor 10 on which also are mounted rolls or cylinders 11 and 12 and a massive cylindrical weight or disk 13. The rolls rest upon the upper surfaces of bars 14, 15 which I may call "trackways," and such trackways are secured on a rigid base or frame 16. The upper surfaces of said bars, on which the rolls rest, are in the same plane and are preferably horizontal in order that gravity will have no tendency to displace the collection of parts which rests upon them. The collection of parts above referred to includes the arbor, rolls, disk, and the gear to be tested, and I call it a rolling unit.

The disk or weight 13 is provided as a balance wheel to furnish mass and inertia to the rolling unit and insure firm contact between the rolls and their supporting surfaces, thus overcoming tendency of the rolling surfaces to slip. The widest or thickest part of the disk is at its periphery and this part fits closely between the parallel inner or adjacent sides of the trackways, in order to avoid danger of the unit being accidentally moved by external force to one side or into a skewed or inclined position. The disk is preferably secured frictiontight on an enlarged central part 17 of the arbor, but the rolls are detachable in order that different rolls, equal in external diameter to the base circle of the particular gear being tested, may be substituted for one another. The rolls are clamped against shoulders on the arbor by nuts 18 and 19, respectively, of which the former acts through the gear and also clamps the latter on the arbor. Thus the parts of the rolling unit are rigidly connected and compelled to roll in unison.

The gear to be tested is shown in Figure 2 as comprising a number of different gear elements 20, 21, 22 and 23 on the same hub or sleeve. In Figure 6, however, only one gear element 24 is shown.

The means which I have provided for testing the accuracy of tooth curves comprises a long pivoted arm 25 which I call for the purposes of this description a "feeler member," a multiplying lever 26, and two indicators 27 and 28, with either of which the multiplying lever may cooperate as later described. The feeler arm is relatively very long and its pivot 29 is set at a substantial distance below the rolling plane (that is, the plane of the supporting surfaces on which the rolls 11 and 12 rest), while the point on its extremity which makes contact with the gear tooth is in the rolling plane. Thus, although such contact point moves about an axis in being displaced, the arc in which it moves is so flat that its divergence from the rolling plane is not appreciable within the limits of its movement in testing even a very inaccurate tooth. The contact point referred to is indicated at 30 and is preferably provided by a piece of extremely hard material, such as a jewel, set into the side of the feeler at its extremity.

The pivot 29 of the feeler is mounted in ears 31 flanking the lower end of the feeler and formed on the upper end of a plunger 32 which is adapted to slide endwise in a holder 33 and projects below the lower end of the holder, being threaded on its projecting end and carrying an adjusting nut 34. A spring 35 is interposed between the hub of the plunger and a shoulder 36 at the top of the guideway in which the plunger is held; while a key 37 set into the plunger and projecting into a keyway 38 in the holder prevents rotation of the plunger. Hence by turning the nut in one direction or the other the feeler member may be raised or lowered so as to bring its contact point with the gear tooth exactly into the rolling plane.

The part which I have referred to as a holder is essentially a sleeve of which the bore above the shoulder 36 is enlarged sufficiently to accommodate the feeler arm and permit the necessary movement thereof.

It is mounted rotatably in a bearing 39 in a carriage 40, being retained in the bearing by a detachable cap 41, and it has a flange 42 at its upper end, which overlaps the upper end of the bearing, and an external shoulder 43 beneath the bearing.

Standards 44 and 45 rise from opposite sides of the top of said holder sleeve and carry pivots 46 and 47 on which the multiplying lever turns. Said lever is a bell-crank and has a rising short arm 26ª of which the extremity is turned toward and is adapted to bear against a plane surface 48 on the side of the feeler member near the extremity of the latter, but far enough below such extremity to clear the teeth of the gear. The long arm of the multiplying lever extends over and rests upon a plunger 49 forming part of the indicator 27. Said plunger is adapted to move endwise and is supported by a spring in the position shown. It is geared to the pointer 50 of the indicator by a rack and pinion or equivalent gearing of such value that slight movements imparted to the plunger are transformed into a wide angular sweep of the pointer. The dial of the indicator is mounted in a rotatable manner to enable its zero point or any other selected graduation of its scale to be placed in register with the pointer.

The indicator 28 at the opposite side of the mechanism is or may be a duplicate of the indicator 27, and is located where the long arm of the multiplying lever may be placed in engagement with its upstanding plunger by rotation of the feeler mechanism in the manner later described. These indicators are not shown in greater detail because those which are used in this machine are of a well known character, being essentially of the type adapted to convert a slight linear movement into multiplied movement at the reading point, and not involving anything novel in this invention excepting in so far as the combination of the indicator with other mechanism is concerned.

A bell crank lever having arms 51 and 52 is mounted by a pivot 53 on the standard 45. The arm 51 rests on an upwardly spring-pressed pin 54 set into the tubular holder 33, while the arm 52 of the lever bears on the feeler arm and maintains the latter in contact with the arm 26ª of the multiplying lever. The spring of the indicator, on the other hand, presses the arm 26ª against the feeler member and is powerful enough to hold the contact point of the feeler member at the opposite side of a plane, which I call the "contact plane", from the multiplying lever.

The contact plane above referred to is the plane which preferably passes through the supporting axis of the feeler member and is perpendicular to the rolling plane. It is the plane in which the tangent point between the tooth being tested and the feeler contact point should lie in order to obtain the most accurate results. However, it is not an essential of the invention that the contact plane should have the precise location above described, provided it has a definite location which is the same when testing all gear teeth.

As previously noted the holder 33 is rotatable in the carriage and a handle 55 by which it may be rotated is connected to the flange 42. This handle projects from a lug 56 on the flange which is adapted to bear against either one of two stop posts 57 and 58 mounted on the carriage. When this lug bears on the stop 57 the feeler mechanism is in the position shown in Figures 1 and 3 and the feeler is adapted to test the right hand faces of the gear teeth in cooperation with the indicator 27. When the feeler mechanism is rotated until the lug 56 bears on the stop 58, the feeler contact point is adapted to engage the left hand faces of the gear teeth and the multiplying lever then lies over and bears on the plunger of the left hand indicator 28. These indicators are supported on arms 59 and 60 which project from opposite sides of the carriage 40.

In using this machine to test or inspect the curves of gear teeth, it is first essential that the contact point be, as nearly as possible, exactly in the rolling plane; since even a slight displacement of this point from such plane will vitiate the results shown by the exceedingly delicate indicating mechanism, and the effects of wear on the contact point, no matter how hard it may be, cause the point of tangency with the gear tooth to be displaced from the rolling plane. The adjustment of the feeler given by the nut 34 enables the contact point to be brought back into the rolling plane, but inasmuch as the extent of shifting of the tangent bearing, due to wear, is indeterminate, manipulation of the nut alone is not enough to ensure correct adjustment; the accuracy of the adjustment must also be tested with a degree of delicacy equal to that with which the tooth curves are tested. For thus testing the position of the contact point, I make use of what I call a "master tooth form", the same being a projection 24$^a$ on the end or periphery of a plate 24$^b$ which is adapted to be placed on the arbor of the rolling unit in substitution for the gear to be tested and is made with a hole to receive the arbor (Figure 7). The projection 24$^a$ has at least one of its faces, and preferably both opposite faces, in form as nearly as possible an accurate involute curve generated to the same base circle as that of the gear tooth to be tested, while the hole for the arbor is at the center of this base circle. By applying such master tooth form to the rolling unit in place of the gear, and adjusting it so as to bear on the feeler contact point, and then rolling the unit, any inaccurate positioning of the feeler contact point will be betrayed by movement of the indicator as the curved face of the master form travels past the contact point. If the contact point is not exactly in the rolling plane it is adjusted by manipulation of the adjusting nut 34 until the point is reached at which no movement of the indicator takes place when the rolling unit is rolled.

In applying and adjusting the master form on the arbor, it is preferably first turned to a position in which it causes the index mark 61 on the multiplying lever 26 to be put in register with a fixed index 62. There are several reasons for doing this; first to bring the contact point into the same vertical plane with the pivot of the feeler member, that is in the same plane perpendicular to the rolling plane, for these indexes are placed so as to register when the contact point is in such plane; second to establish like conditions surrounding both the adjustment of the feeler and the testing of the gear; and third to ensure a predetermined degree of pressure between the master form and the feeler.

As a further precaution to ensure correct adjustment of the feeler, the sides of the master form are recessed at either side, as indicated at 24$^c$, as to those parts of its side faces which extend within the base circle. The location of the base circle is indicated by the broken line 24$^d$. Preferably the outer limits of the recesses 24$^c$ are outside of the base circle. The parts of the master form thus cut away are parts which would either contain a fillet or would be radial to the arbor of the rolling unit, if the master form were the exact counterpart of a gear tooth. Hence the cutting away of the form as thus shown ensures that the only part of the curve which can be placed against the contact point, at least without instant detection of the error, will be a part of the involute curve, and not part of a fillet or plane surface which deviates from the curve. In most involute gears the fillet at the root of the tooth extends outside of the base circle, and hence would cross the rolling plane when brought into the contact plane, and if the contact point were placed against a portion of the fillet, the indicator would appear to show an error in the involute curve which actually does not exist.

After the feeler has been adjusted, the gear is substituted for the master form and turned on the arbor until a point on the tooth face, outside of the fillet, is brought to bear against the feeler contact, and the rolling unit as a whole is placed where the rim of its balance disk 13 bears against a stop 63. This stop is provided to afford a fixed point of departure, which is the same for all teeth of the gear, and is adjustable both parallel and perpendicular to the rolling plane in order that it may be placed at the proper point with respect to rolling units organized to carry gears of respectively different diameters of base circle.

In the case where the right hand face of the teeth at the under side of the gear are being tested, the stop at the right of the rolling unit is placed to arrest the unit at the point where the part of the gear tooth curve adjacent to, and outside of, the fillet may be brought into contact with the feeler, and the gear is adjusted on the arbor, and made fast, in the position where it bears on the feeler and brings index mark 61 into register with the fixed index 62. Then the unit is rolled to the left until the face being tested travels past the contact point, the gear is loosened on the arbor, and turned to bring the next tooth into testing position; the rolling unit is returned until it brings up against the stop, the gear is adjusted on the arbor and clamped with the face of the second tooth bearing on the contact point in the same location as before described, and the rolling movement is repeated. The same procedure is carried out with respect to all of the gear teeth which need to be tested; and in doing so the movements of the indicating pointer which occur if the teeth are not accurate, are noted and recorded.

When the left hand faces are tested, the indicating mechanism is reversed into the position shown in Figure 4, and the same procedure is carried out except that the rolling unit is rolled to the right from a counterpart of the stop 63 located at its left.

From time to time, as the contact point is worn away after repeated rubbing upon the gear teeth, it is readjusted to correct position in the manner explained. As a convenient measure, to avoid need of changing the rolling unit when adjusting and testing the location of the feeler, I may provide a number of different master forms corresponding to the different gears, although in principle a single master form will do, provided it has an involute face and is rolled on the base circle of this involute curve.

The present invention also includes a feature which resides in means for placing the feeler mechanism in different planes transverse to the axis of the rolling unit. One purpose of such placement is to permit the testing of gears which are so connected together, as shown in Figure 2, that all of the gears cannot be placed in the same plane on the arbor of the rolling unit. Another use of the feature referred to is found where single gears having holes which may vary slightly in diameter are placed on a tapered arbor 10ª, as shown in Figure 6. A certain manufacturing tolerance is allowed in the diameter of the holes of gears of a given size, and such tolerance, even though it may be no more than one thousandth of an inch, would result in the gear which has a hole approximating the larger limit of tolerance being eccentric to the arbor which is small enough to receive gears in which the holes are of the smallest allowable diameter. Such eccentricity, although slight, would show in the multiplying indicator and would apparently indicate inaccuracies which the gear teeth do not have, or inaccuracies of a different character than those which they actually have.

By making the arbor with a taper running from the smaller to the larger limits of tolerance and so long that its taper is gradual enough to provide a firm bearing for the gears, it is possible to center accurately all the gears having these slight differencies; but, incidentally, different gears will be at different distances from the end of the arbor. But wherever the gear may be placed, the capacity of the feeler mechanism to be located in different planes permits them all to be tested.

The means for thus shifting the feeler mechanism shown in Figures 1 to 3 consists in mounting the carriage 40 in a sliding manner on two rigid bars 65 which are set into the base of the testing machine and project parallel with the arbor of the rolling unit. The carriage is provided with sleeves or tubular bearings 66 which fit slidingly on these bars and carry clamp rods 67 and set-screws 68. The clamp rods are recessed at the side adjacent to the supporting bar so as partly to embrace the same and the set-screws 68 are arranged to apply endwise pressure to the adjacent clamp rods.

In the arrangement shown in Figures 5 and 6 the supporting bars 65ª are secured rigidly to the carriage and pass in a sliding manner through guideways 69 formed in the base.

The feature last described is not limited in its utility to a form of feeler mechanism which is reversible in the manner hereinbefore described, but is applicable as well to machines having specifically different constructions or arrangements of feeler and indicating means.

Although I have shown the cylinders 11 and 12 of the rolling unit as complete cylinders, I wish to say that the operativeness of the invention, and the scope in which I claim protection do not at all depend upon these cylinders being complete. On the contrary since the rolling unit needs to turn through only a small part of one revolution about its own axis in testing a tooth, I may equally well use cylindrical segments or incomplete cylinders as the means for supporting the rolling unit, with capacity for rolling of the trackways. Hence whenever used in this specification and in the appended claims the term "cylinder" or "cylindrical" is to be understood as including partial cylinders as well as complete cylinders.

What I claim and desire to secure by Letters Patent is:

1. A machine for testing involute curves comprising a base having a plane surface establishing the rolling plane, a rolling unit including means for supporting the article having the involute surface to be tested and including also a cylindrical surface equal in diameter to the base circle of the said involute surface and adapted to roll on said plane surface, a feeler member having a contact point adapted to engage with the said involute surface in said rolling plane and being movable in said plane, means for multiplying the movements of said feeler, a holder for the feeler, and a plunger mounted in said holder and being adjustable transversely to the said rolling plane and on which the feeler is mounted.

2. In a machine of the character described, a base having a plane supporting surface, a feeler having a contact point, and means for adjusting said feeler to bring said contact point into the same plane with said supporting surface, comprising a plunger on which the feeler is mounted, a holding structure in which said plunger is movable transversely of said plane, and means for so moving said plunger.

3. In a machine of the character described, a base having a plane supporting surface, a feeler having a contact point, and means for adjusting said feeler to bring said contact point into the same plane with said supporting surface, comprising a plunger on which the feeler is mounted, a holding structure in which said plunger is movable transversely of said plane, a spring engaged with the plunger and reacting on said structure with tendency to move the plunger in one direction, and a nut threaded on the plunger and reacting on said structure in opposition to the force exertion of said spring.

4. A machine of the character described comprising a base having a plane supporting surface, a rolling unit adapted to roll on said surface and having means for carrying the article to be tested, a holding structure having a guideway below the plane of said supporting surface, a slide mounted in said guideway and movable therein transversely to the plane of said supporting surface, a feeler member mounted on said slide and extending thence toward the plane of said surface and having a contact point adapted to be placed in said plane, and means for adjusting said slide so as to shift the position of the contact point relatively to said plane.

5. A machine of the character described comprising a base having a plane supporting surface, a rolling unit adapted to roll on said surface and having means for carrying the article to be tested, a holding structure having a guideway below the plane of said supporting surface, a slide mounted in said guideway and movable thereon transversely to the plane of said supporting surface, a feeler member pivoted to said slide and extending thence toward the plane of said surface and having a contact point adapted to be placed in said plane, and means for adjusting said slide so as to shift the position of the contact point relatively to said plane, said adjusting means comprising a nut and a screw engaged with the slide and reacting oppositely to one another upon said holding structure.

6. A machine for testing involute gear teeth comprising a rolling unit including an arbor on which the gear to be tested may be mounted and a cylindrical rolling surface equal in diameter and circumference to the base circle of such gear, said arbor having a length substantially greater than the thickness of such gear and being adapted to hold gears on different parts of its length, a base having a plane supporting surface against which said rolling surface rests, a feeler having a contact point arranged to bear against the involute face of a tooth of said gear, multiplying indicating means arranged to show on an enlarged scale movements of said contact point transverse to the axis of said arbor, and means for supporting said feeler with provision for adjustment lengthwise of the arbor, whereby to bring the feeler contact point into the planes of gears differently positioned on the arbor.

7. A machine for testing involute gear teeth comprising a rolling unit including an arbor on which the gear to be tested may be mounted and a cylindrical rolling surface equal in diameter and circumference to the base circle of such gear, said arbor beyond said rolling surface having a length sufficient for placement on it at one time of a plurality of gears spaced apart in axial alinement, a base having a plane supporting surface against which said rolling surface rests, a feeler having a contact point arranged to bear against the involute face of a tooth of said gear, multiplying indicating means arranged to show on an enlarged scale movements of said contact point transverse to the axis of said arbor, and a carriage supporting said feeler and multiplying means, said carriage being adjustable lengthwise of the arbor to place the feeler contact point in the planes of gears differently positioned on the arbor.

8. A machine for testing involute gear teeth comprising a rolling unit including an arbor on which the gear to be tested may be mounted and a cylindrical rolling surface equal in diameter and circumference to the base circle of such gear, said arbor beyond said rolling surface having a length sufficient for placement on it at one time of a plurality of gears spaced apart in axial alinement, a base having a plane supporting surface against which said rolling surface rolls, a feeler having a contact point arranged to bear against the involute face of a tooth of said gear, multiplying indicating means arranged to show on an enlarged scale movements of said contact point transverse to the axis of said arbor, a carriage supporting said feeler and multiplying means, and bars projecting from the side of said base parallel with the arbor of the rolling unit, by means of which bars said carriage is mounted with provision for adjustment to bring the feeler contact point into the planes of gears differently positioned on said arbor.

9. A machine for testing involute gear teeth comprising a rolling unit having means for holding a gear to be tested and a rolling surface coaxial and equal in diameter and circumference to the base circle of such gear, a base having a supporting plane surface on which the rolling surface of said unit is adapted to roll, a feeler member pivotally mounted below the plane of said supporting surface to swing transversely of the axis of the rolling unit, and having a contact point arranged to enter the space between two teeth of said gear and engage the involute face of one of such teeth, a multiplying lever having a short arm bearing on said feeler member near the contact point thereof, and also having a long arm, a holder by which the feeler member and multiplying lever are mounted; and means for mounting said holder reversibly in such manner that the contact point of the feeler member may be brought into operative engagement with either of the teeth bounding the space into which the feeler projects.

10. A machine for testing involute gear teeth comprising a rolling unit having means for holding a gear to be tested and a rolling surface coaxial and equal in diameter and circumference to the base circle of such gear, a base having a supporting plane surface on which the rolling surface of said unit is adapted to roll, a feeler member pivotally mounted below the plane of said supporting surface to swing transversely of the axis of the rolling unit, and having a contact point arranged to enter the space between two teeth of said gear and engage the involute face of one of such teeth, a multiplying lever having a short arm bearing on said feeler member near the contact point thereof, and also having a long arm, and a holder by which the feeler member and multiplying lever are mounted; said holder being mounted rotatably to turn about an axis substantially perpendicular to the plane of the supporting surface and substantially in the pivot axis of the feeler.

11. A machine for testing involute gear teeth comprising a rolling unit having means for holding a gear to be tested and a rolling surface coaxial and equal in diameter and circumference to the base circle of such gear, a base having a supporting plane surface on which the rolling surface of said unit is adapted to roll, a feeler member pivotally mounted below the plane of said supporting surface to swing transversely of the axis of the rolling unit, and having a contact point arranged to enter the space between two teeth of said gear and engage the involute face of one of such teeth, a multiplying lever having a short arm bearing on said feeler member near the contact point thereof, and also having a long arm, and a holder by which the feeler member and multiplying lever are mounted; and means for mounting said holder reversibly in such manner that the contact point of the feeler member is brought into operative engagement with either of the teeth bounding the space into which the feeler projects, and indicators located at opposite sides of the holder, each in position to cooperate with the long arm of the multiplying lever when the holder is in one or the other of its operative positions.

12. A machine for testing involute gear teeth comprising a rolling unit having means for holding a gear to be tested and a rolling surface coaxial and equal in diameter and circumference to the base circle of such gear, a base having a supporting plane surface on which the rolling surface of said unit is adapted to roll, a feeler member pivotally mounted below the plane of said supporting surface to swing transversely of the axis of the rolling unit, and having a contact point arranged to enter the space between two teeth of said gear and engage the involute face of one of such teeth, a multiplying lever having a short arm bearing on said feeler member near the contact point thereof, and also having a long arm, and a holder by which the feeler member and multiplying lever are mounted; said holder being mounted rotatably to turn about an axis substantially perpendicular to the plane of the supporting surface and substantially in the pivot axis of the feeler, and stops arranged to limit rotational movement of the holder in positions wherein respectively the feeler contact point is arranged to engage operatively one or the other of the gear tooth faces bounding the space occupied by said contact point.

13. A machine for testing involute gear teeth comprising a rolling unit having means for holding a gear to be tested and a rolling surface coaxial and equal in diameter and circumference to the base circle of such gear, a base having a supporting plane surface on which the rolling surface of said unit is adapted to roll, a feeler member pivotally mounted below the plane of said supporting surface to swing transversely of the axis of the rolling unit, and having a contact point arranged to enter the space between two teeth of said gear and engage the involute face of one of such teeth, a multiplying lever having a short arm bearing on said feeler member near the contact point thereof, and also having a long arm, and a holder by which the feeler member and multiplying lever are mounted; said holder being mounted rotatably to turn about an axis substantially perpendicular to the plane of the supporting surface and substantially in the pivot axis of the feeler, and stops arranged to limit rotational movement of the holder in positions wherein respectively the feeler contact point is arranged to engage operatively one or the other of the gear tooth faces bounding the space occupied by said contact point, and indicators located at opposite sides of the holder, each having an operating element arranged for engagement with, and actuation by, the long arm of said multiplying lever when the holder is in one or the other of its limit positions.

14. A machine for testing involute gear teeth comprising a rolling unit including an arbor on which the gear to be tested may be mounted and a cylindrical rolling surface equal in diameter and circumference to the base circle of such gear, a base having a plane supporting surface against which said rolling surface rests, a feeler having a contact point arranged to bear against the involute face of a tooth of said gear, multiplying indicating means arranged to show on an enlarged scale movements of said contact point transverse to the axis of said arbor, and means for supporting said feeler with provision for adjustment lengthwise of the arbor, whereby to bring the feeler contact point into the planes of gears differently positioned on the arbor, and means for adjusting said feeler additionally to place its contact point in the plane of said supporting surface.

15. A machine for testing involute gear teeth comprising a rolling unit having means for holding a gear to be tested and a rolling surface coaxial and equal in diameter and circumference to the base circle of such gear, a base having a supporting plane surface on which the rolling surface of said unit is adapted to roll, a feeler member pivotally mounted below the plane of said supporting surface to swing transversely of the axis of the rolling unit, and having a contact point arranged to enter the space between two teeth of said gear and engage the involute face of one of such teeth, a multiplying lever having a short arm bearing on said feeler member near the contact point thereof, and also having a long arm, and a holder by which the feeler member and multiplying lever are mounted; and means for mounting said holder reversibly in such manner that the contact point of the feeler member is brought into operative engagement with either of the teeth bounding the space into which the feeler projects, and a plunger holding the pivot of the feeler member, said plunger being secured in said holder and being adjustable relatively thereto in such directions as to place the contact point of the feeler in the plane of said supporting surface.

16. A gear testing machine including a rolling unit having an arbor for holding the gear to be tested, a movable feeler adapted to engage the involute faces of the gear teeth, a plane supporting surface on which said unit rolls; the feeler being adjustable transversely of the plane of said surface to bring its contact point into said plane, and a master tooth form having an involute face generated to the same base circle as the gear being tested adapted to be applied to the arbor and to be used for determining when the feeler point is in the contact plane of said supporting surface.

17. A rolling unit having an arbor and a rolling surface concentric with said arbor, combined with a master tooth form applicable to the arbor and formed with a face which is an involute curve of said rolling surface.

18. A rolling unit as set forth in claim 17 in which the face of the master curve is relieved in a predetermined part.

19. A master tooth form constructed with provisions for being mounted on a rolling unit of the character set forth and having a surface formed with an involute curve, the side of said tooth form being relieved inside of the base line of said involute curve.

In testimony whereof I have affixed my signature.

EDWIN R. FELLOWS.